United States Patent
Gautam

(10) Patent No.: US 8,065,098 B2
(45) Date of Patent: Nov. 22, 2011

(54) PROGRESSIVE HUMIDITY FILTER FOR LOAD DATA FORECASTING

(75) Inventor: Shruti Gautam, Pleasanton, CA (US)

(73) Assignee: Schneider Electric USA, Inc., Palatine, IL (US)

( * ) Notice: Subject to any disclaimer, the term of this patent is extended or adjusted under 35 U.S.C. 154(b) by 530 days.

(21) Appl. No.: 12/333,898

(22) Filed: Dec. 12, 2008

(65) Prior Publication Data

US 2010/0153035 A1    Jun. 17, 2010

(51) Int. Cl.
    *G01R 21/00*    (2006.01)
(52) U.S. Cl. ............ 702/62; 702/60; 702/61; 700/291; 700/297; 700/276; 700/286; 700/292; 705/412; 705/400; 705/333; 340/584
(58) Field of Classification Search ............ 702/61, 702/60, 62, 176, 177, 183; 700/291, 297, 700/276, 295, 296, 286, 293, 292; 705/412, 705/400, 26.3, 333; 340/584, 673
    See application file for complete search history.

(56) References Cited

U.S. PATENT DOCUMENTS

| | | | | |
|---|---|---|---|---|
| 5,566,084 | A * | 10/1996 | Cmar ............................ | 700/276 |
| 6,366,889 | B1 * | 4/2002 | Zaloom ........................ | 705/7.37 |
| 6,577,962 | B1 * | 6/2003 | Afshari .......................... | 702/61 |
| 6,865,450 | B2 * | 3/2005 | Masticola et al. ............ | 700/291 |
| 7,236,908 | B2 * | 6/2007 | Timko et al. .................. | 702/176 |
| 7,373,221 | B2 * | 5/2008 | Lal ................................ | 700/291 |
| 7,409,303 | B2 * | 8/2008 | Yeo et al. ....................... | 702/60 |
| 7,551,984 | B1 * | 6/2009 | Fickey et al. ................. | 700/291 |
| 7,647,137 | B2 * | 1/2010 | Schindler ...................... | 700/291 |
| 7,801,647 | B2 * | 9/2010 | Fickey et al. ................. | 700/291 |
| 2003/0050738 | A1 * | 3/2003 | Masticola et al. ............ | 700/291 |
| 2003/0078797 | A1 * | 4/2003 | Kanbara et al. ................... | 705/1 |
| 2003/0216971 | A1 * | 11/2003 | Sick et al. ....................... | 705/26 |
| 2004/0102937 | A1 * | 5/2004 | Ibrahim ............................ | 703/2 |
| 2004/0225649 | A1 * | 11/2004 | Yeo et al. ............................ | 707/3 |
| 2004/0254899 | A1 * | 12/2004 | Abe et al. ........................ | 705/412 |
| 2005/0096797 | A1 * | 5/2005 | Matsubara et al. ........... | 700/291 |
| 2005/0192915 | A1 * | 9/2005 | Ahmed et al. .................. | 706/21 |
| 2006/0161310 | A1 * | 7/2006 | Lal ................................ | 700/295 |
| 2008/0228325 | A1 * | 9/2008 | Schindler ...................... | 700/291 |
| 2009/0204368 | A1 * | 8/2009 | Bickel ............................. | 702/179 |
| 2011/0087382 | A1 * | 4/2011 | Santacatterina et al. ...... | 700/291 |

FOREIGN PATENT DOCUMENTS

| | | |
|---|---|---|
| JP | 2004072900 A * | 3/2004 |
| JP | 2008057854 A * | 3/2008 |

* cited by examiner

*Primary Examiner* — Carol Tsai

(57) ABSTRACT

A method, via a processor, of forecasting energy usage including selecting a plurality of reference days with at least one feature matching a corresponding feature of a day to be forecasted and filtering the plurality of reference days with a humidity filter to identify at least one matching reference day. The at least one matching reference day is associated with a correlation coefficient greater than or equal to a minimum correlation coefficient, and a minimum number of humidity values within a range of corresponding humidity values of the day to be forecasted. The method also includes retrieving energy load values and corresponding temperature values corresponding to the at least one matching reference day, calculating a plurality of regression coefficients of a polynomial equation linking the temperature values to the energy load values, and calculating and storing a forecasted load value of the day to be forecasted according to the polynomial equation.

20 Claims, 5 Drawing Sheets

PROGRESSIVE HUMIDITY FILTER FOR LOAD DATA FORECASTING

FIELD OF THE INVENTION

The present invention relates to a method of using historical humidity data to increase the accuracy of forecasts for energy load demand.

BACKGROUND OF THE INVENTION

Forecasting electrical power usage can be desirable to an entity for planning and budgetary purposes. For example, a manufacturer may desire to forecast power usage for a factory to determine an amount of money to budget for such usage. Similarly, a company may desire to forecast its power usage in order to negotiate a rate contract with a utility supplying the electrical power.

Demand for electrical power (the energy usage, or load, on the electrical system) at any point in time is dependent upon weather factors such as temperature, humidity, wind, and precipitation (with reducing dependence in the order specified and temperature affecting the load most significantly). Load is also influenced by other factors such as the day of the week, or if the day is a holiday or other day of atypical load. For example, a factory likely will demand a higher load on a work day, when it is producing goods, and demand a lower load on weekends and holidays when there is no production. Using regression methods it is possible to identify a mathematic relationship that allows the load to be forecasted if a forecasted temperature at a specific time is known. The accuracy of the forecast can be increased if other factors such as the humidity and any special characteristics of the day (e.g., the day of the week, holiday, etc.) are taken into account in selecting reference data points (e.g., reference days).

Since statistical methods are used to create the model that would represent the relationship between load and temperature, the accuracy of the model depends upon not only the number of data points used to create the model but also the statistical relevance of those data points to the model. The accuracy of a load data forecast depends upon the accuracy of the statistical model developed to represent a relationship between load and temperature. The accuracy of the statistical model in turn depends upon the quality of the reference days used to create the model.

Reference days may have similar overall humidity profiles to the day to be forecasted (as determined by correlating humidity measurements of a reference day to predicted humidity values of the day to be forecasted). However the reference days may have extremely different humidity values and hence may not be good predictors for the day to be forecasted. Also, it may be difficult or impossible to differentiate one reference day from another in terms of its quality as a predictor based only on a correlation coefficient with respect to the day to be forecasted. For example, a group of reference days with humidity profiles similar to the day to be forecasted may fall into any of the following categories:

- very similar humidity values and very similar humidity profile to the day to be forecasted;
- somewhat similar humidity values and somewhat similar humidity profiles to the day to be forecasted; and
- similar overall humidity profiles but extremely different humidity values to day to be forecasted.

Reference days with very similar humidity values and very similar humidity profiles to the day to be forecasted are the best predictors to use in developing a model to forecast load data. Reference days with somewhat similar humidity values and somewhat similar humidity profiles to the day to be forecasted can be useful to develop the model, but only if a large enough number of reference days with very similar humidity values and very similar humidity profiles cannot be found. However it is difficult to differentiate between these three categories, as a humidity profile only gives a linear trend of the humidity values of a historical day compared to the day to be forecasted. Individual humidity values of the historical day can be very dissimilar to a corresponding humidity value of the day to be forecasted, even if the overall linear trends are similar. What is needed is a way to differentiate between reference days with very similar humidity values and profiles from days with somewhat similar humidity values and profiles, as well as a way to exclude days with similar humidity profiles and extremely dissimilar humidity values. The present disclosure is directed to addressing these and other needs and solving these and other problems.

SUMMARY OF THE INVENTION

According to an aspect of the present disclosure, a method, via a processor, of forecasting energy usage includes selecting a plurality of reference days with at least one feature matching a corresponding feature of a day to be forecasted and filtering the plurality of reference days with a humidity filter to identify at least one matching reference day. The at least one matching reference day is associated with a correlation coefficient greater than or equal to a minimum correlation coefficient, and a minimum number of humidity values within a range of corresponding humidity values of the day to be forecasted. The method also includes retrieving energy load values and corresponding temperature values corresponding to the at least one matching reference day, calculating a plurality of regression coefficients of a polynomial equation linking the temperature values to the energy load values, and calculating and storing a forecasted load value of the day to be forecasted according to the polynomial equation.

According to another aspect of the present disclosure, a method of identifying, via a processor, a matching reference day for energy usage forecasting includes retrieving a reference day record from a memory, and comparing feature information of the reference day record to a feature criteria. The method also includes, responsive to the feature information matching the feature criteria, comparing at least one humidity value associated with the reference day record to at least one forecasted humidity value, and calculating a correlation coefficient representing a comparison of a humidity profile associated with the reference day record to a forecasted humidity profile. The method also includes, responsive to the at least one humidity value being within a humidity deviation range of the at least one forecasted humidity value and the correlation coefficient equaling or exceeding a minimum correlation coefficient, identifying the reference day as a matching reference day. The method further includes storing the matching reference day in a matching reference day list in the memory.

According to another aspect of the present disclosure, a computer readable medium has stored thereon instructions for identifying a matching reference day for energy usage forecasting. The instructions include machine executable code that when executed by a processor, causes the processor to perform steps. The steps include retrieving a reference day record from a memory and comparing feature information of the reference day record to a feature criteria. Responsive to the feature information matching the feature criteria, at least one humidity value associated with the reference day record is compared to at least one forecasted humidity value, and a correlation coefficient representing a comparison of a humidity profile of the reference day record is compared to a forecasted humidity profile. Responsive to the at least one humidity value being within a humidity deviation range of the at least one forecasted humidity value and the correlation coefficient equaling or exceeding a minimum correlation coefficient, the reference day is identified as a matching reference day. The steps further include storing the matching reference day in a matching reference day list in the memory.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
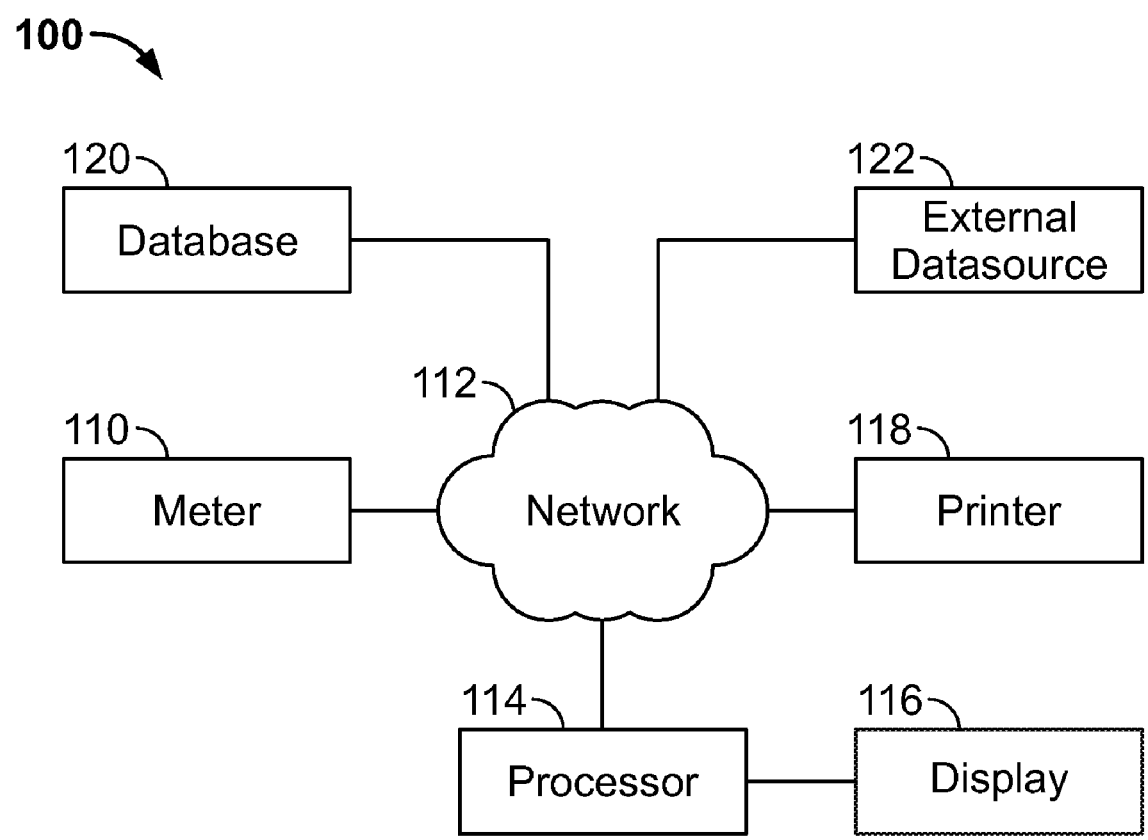
FIG. 1 is a block diagram of a system that includes some of the elements used in aspects of the present disclosure.

FIG. 1 shows a system 100 for forecasting load demand. A meter 110 records measurements, for example energy usage values, temperature values, and/or humidity values, in time increments (e.g., 5 minutes, 15 minutes, 1 hour, etc.). The meter 110 can be, for example, an electrical meter for a building, factory, shopping mall, etc. The meter 110 may also be a meter that records weather data. The meter 110 is coupled to a network 112. The meter 110 can communicate the energy usage, temperature, and/or humidity data for each time increment over the network 112 to a memory such as a database 120 coupled to the network 112. An external data source 122 may be also be coupled to network 112 and can be used to store energy usage, temperature or humidity values for each time increment of a particular day. The database 120 can store the energy usage, temperature, and/or humidity values for a particular day in one or more records for that day.

Additional information can be stored in the database 120 along with the energy usage values. For example, the record can store feature information, such as whether the day is a holiday, workday, atypical energy usage day, etc. The feature information can be generic, for example limited to whether the day is a weekday, weekend, etc. The feature information can also be specific to a particular entity (e.g., factory, shopping mall etc). For example, a factory that does not operate on weekends or holidays may want to assign feature values to weekdays, weekends, and holidays so that weekends and holidays are not used in making predictions for weekdays. The historical day records stored on the database 120 may be queried and edited by a processor 114 coupled to the database 120 either directly or through the network 112. The processor can be, for example, a computer or mainframe.

The processor 114 can also execute an algorithm for forecasting load for forecasted temperature and humidity values. Alternatively, a separate processor (not shown) coupled to the network 112 or database 120 can execute the algorithm. The predicted load values can be stored in the database 120. The predicted load values can also be communicated to output devices coupled to the processor 114 or the network 112. For example, predicted load values can be displayed on a display 116 coupled to the processor 114 or printed using a printer 118 coupled to the network 112. The printer 118 can also be coupled to the processor 114 and the display can also be coupled to the network 112.

Figure 2:
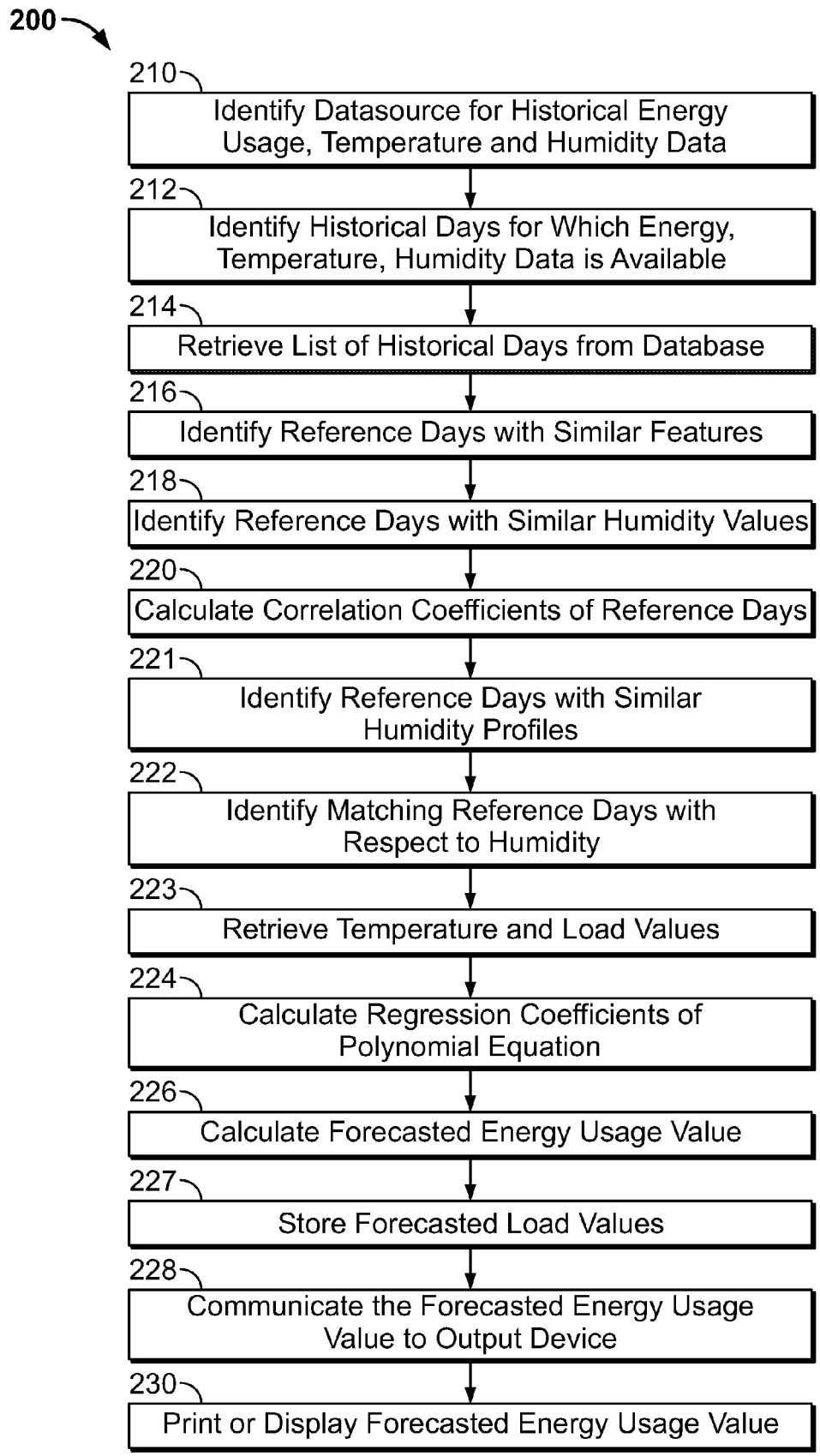
FIG. 2 is a flow chart of a method that includes some of the aspects of the present disclosure.

FIG. 2 shows a flowchart of a method of predicting energy usage values. A datasource or datasources for historical energy usage, temperature, and humidity data is identified by processor 114 (210). For example, the database 120 can store energy usage, temperature, and humidity data for a particular historical day in one or more records for that day. The external datasource 122 can also store energy usage, temperature, and humidity data for a particular historical day in one or more records or files. Moreover, historical data can be stored using a combination of the database 120 and the external datasource 122. For example. The meter 110 can stores energy usage values for time intervals to the database 120 (e.g., energy usage values for each hour of a day) and temperature and humidity data for the time intervals can be stored on the external datasource 122. The processor 114, executing a hybrid algorithm to forecast load data, identifies historical days for which energy usage, temperature and humidity data is available (212) and creates a list of such historical days. (214).

The hybrid algorithm to forecast load data can be implemented as machine readable software code, microcode, firmware, etc., executing on the processor 114. The algorithm takes into consideration weather conditions (temperature, humidity, etc.) and features of the day (weekday, weekend, holiday, etc.). Reference days can be chosen by first selecting days with the same or similar features as the day to be forecasted (i.e., weekday, closed days, weekend, holiday, etc.) (216). In selecting days with similar features as the day to be forecasted, the processor 114 can evaluate the features by comparing feature values in the historical day records to feature values of the day to be forecasted. In selecting days with similar features to the day to be forecasted, days known to have atypical energy usage can be removed. These days will disturb the calculation of the forecast load. Atypical days can be denoted through a feature value in the historical day record for the day. Distinctions can be drawn between workdays (e.g., weekdays) and closed days (e.g., weekends and holidays). For example, if the day to be forecasted is a weekday, historical weekdays can be chosen as potential reference days. If other historical days are known to be atypical (e.g., unusual operating hours), those days can be removed from the potential reference days. Similar features can include feature values that match (e.g., historical and predicted feature value both equal weekend), or can include different values that can be considered a match (e.g., historical value of Monday and predicted value of Wednesday are both weekdays, and can be can be considered a match).

A humidity filter algorithm can be executed by the processor 114 as part of the hybrid algorithm, and applied to potential reference days that have similar features to the day to be forecasted. The humidity filter algorithm compares humidity values of potential reference days with predicted humidity values of the day to be forecasted to identify days with similar humidity values to the day to be forecasted (218). The humidity values are evaluated for each time interval. For example, the humidity value for 10 am of the potential reference day is compared to the predicted humidity value for 10 am of the day to be forecasted. If the humidity value of the potential reference day is within a range of the corresponding humidity value (e.g., within 5 units of relative humidity ("RH")) of the day to be forecasted, it is a similar humidity value. If the potential reference day has greater than a minimum number or percentage of humidity values similar to the corresponding values of the day to be forecasted (or less than a maximum number or percentage of dissimilar values) (e.g., 75% of humidity values within the range), the potential reference day can be identified as a reference day with similar humidity values to the day to be forecasted.

The potential reference days identified in 218 can further be filtered by determining their humidity profiles. The humidity profile of a potential reference day can be determined by calculating a correlation coefficient of the potential reference day compared to the day to be forecasted (220). The correlation coefficient indicates the strength and direction of the linear relation between the hourly forecast humidity data of the day to be forecasted and hourly past humidity data of the potential reference day, assuming the chosen time increments are one hour increments. The linear relationship is evaluated because past humidity data should be as close as possible to forecasted humidity data in order to identify the reference days most likely to be accurate predictors of load. Reference days with similar humidity profiles to the day to be forecasted are identified (221). Specifically, a reference day has a similar humidity profile to the day to be forecasted if its correlation coefficient is greater than a minimum correlation coefficient. Correlation coefficients fall within the range of 0 to 1, with 1 indicating the highest level of similarity and 0 representing the lowest level of similarity. The minimum correlation coefficient (e.g., 0.5) can be chosen based on the purpose, and desired accuracy, of the load forecasting. For example, if a utility customer is forecasting its energy usage to negotiate a rate contract with the utility, the customer may want a highly accurate forecast of energy usage. A potential reference day with both similar humidity values and a similar humidity profile as the day to be forecasted can be identified as a matching reference day (222).

Figure 3:
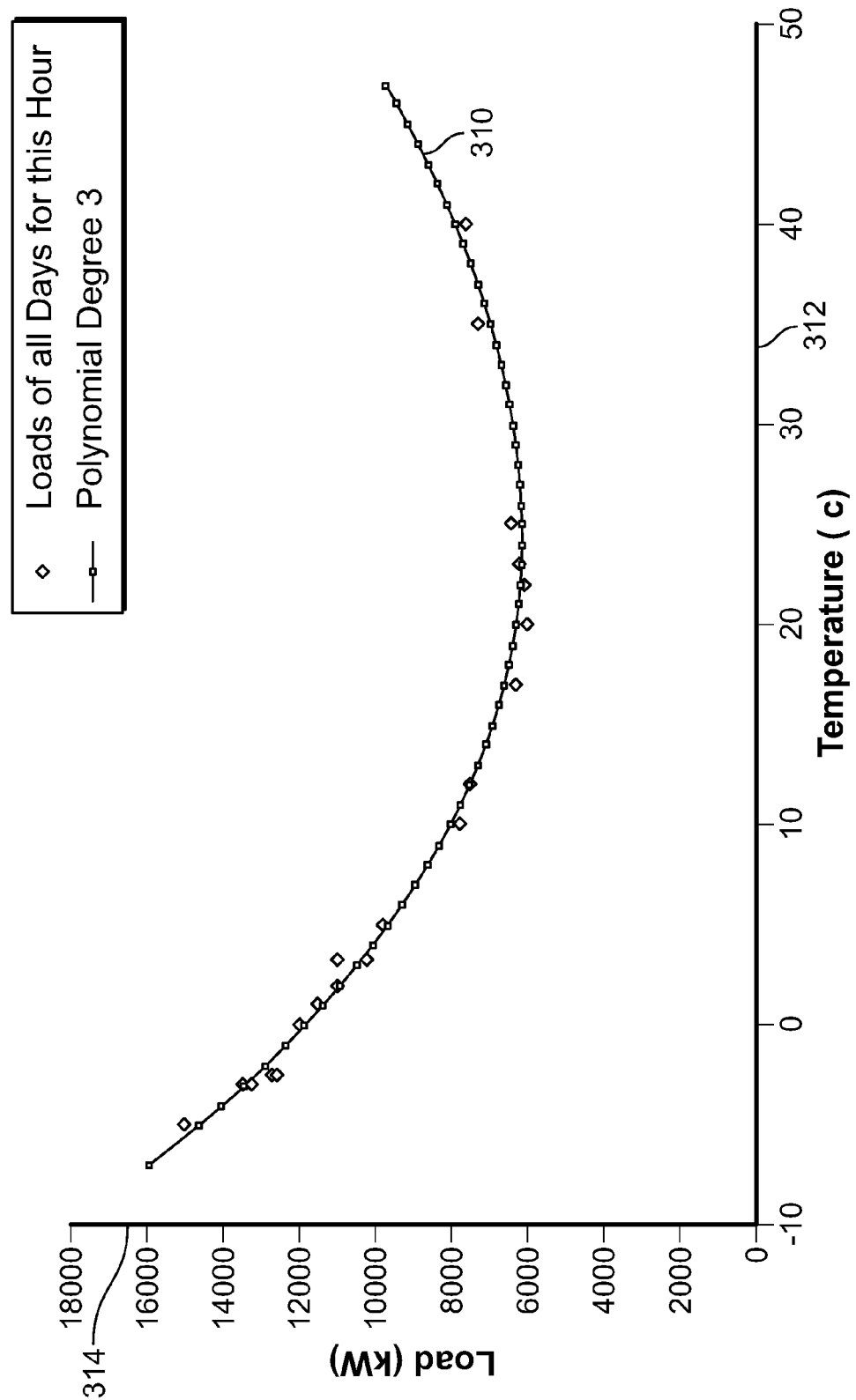
FIG. 3 is a graph of a relationship between load values and temperature values according to some of the aspects of the present disclosure.

Once matching reference days are identified, load values and temperature values for the reference days are retrieved (223). The processor 114 can apply a regression method to determine the mathematic relationship between the load values and the temperature values (224). For example, a least mean squares regression method can be used to determine this relationship. By choosing a desired precision (i.e., a degree of polynomial), the method of least mean squares can be used to determine a line or curve that represents a best fit for the load and temperature values. FIG. 3 illustrates an example where load and temperature values for all reference days identified in (222) at a particular hour of the day are shown as points on a graph. Load values are shown on the Y-axis 314 and temperature values are shown on the X-axis 312. The method of least mean squares is be used to create a parabola 310 to best represents the relationship between the load and temperature values. This relationship between load and temperature can be represented by a $3^{rd}$ degree polynomial equation as follows:

$$F(x)=ax^3+bx^2+cx+d \quad \text{[Equation 1]}$$

where F(x) is the load value for a particular temperature value x, and a, b, c, and d are the coefficients of the polynomial equation determined by the regression method of least mean squares.

A forecasted load value for a particular hour can be calculated by the processor 114 by inputting the forecasted temperature value for that hour into the polynomial equation for that hour (226). Forecasted load values for the hours to be forecasted can be stored in the database (FIG. 1, 120) (227) and can also be communicated to one or more of the output devices (e.g., the printer 118 and the display 116 of FIG. 1) (228). The forecasted load values can then be displayed or printed (230).

Figure 4A:
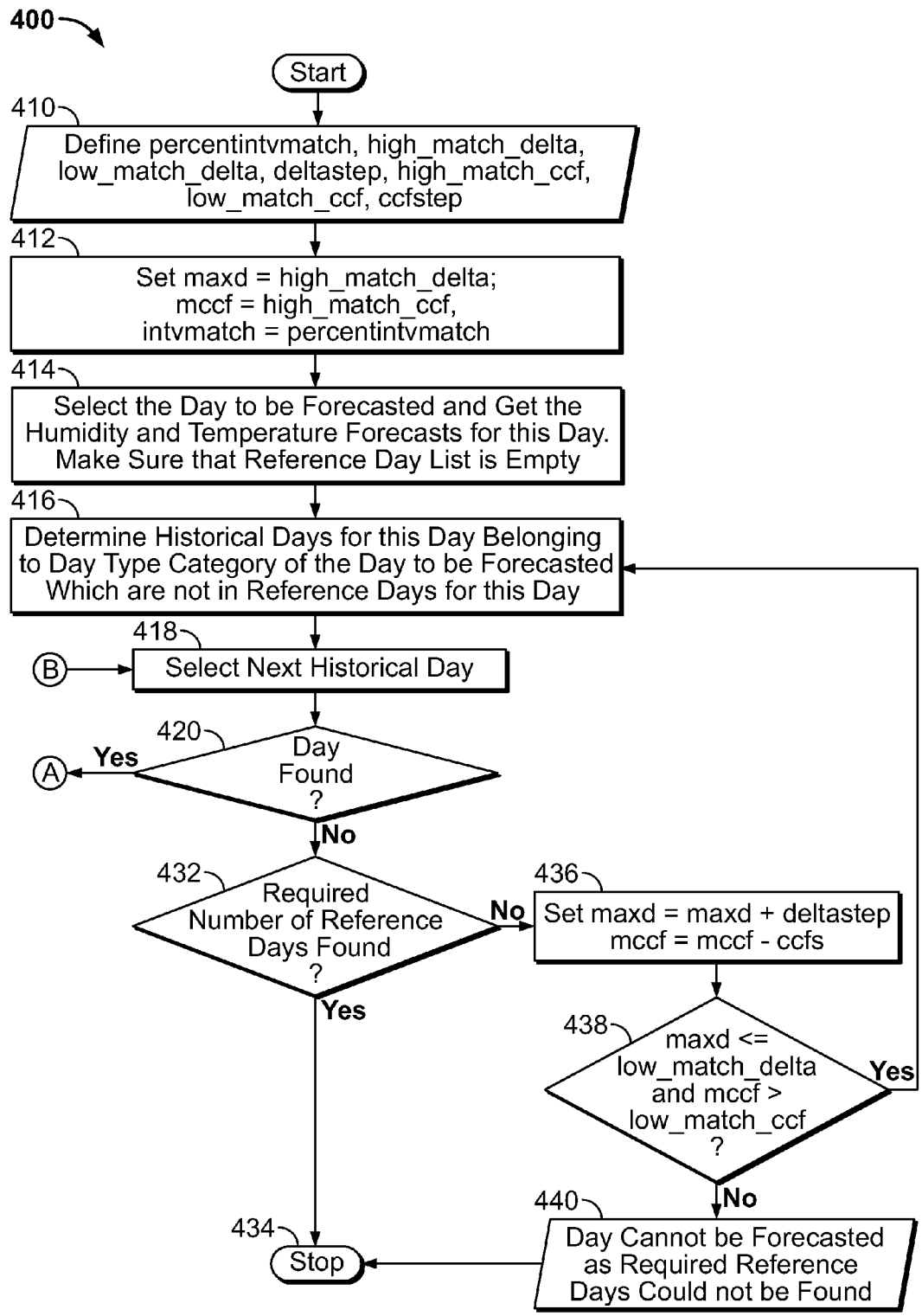
FIGS. 4A and 4B depict a flow chart of an algorithm that includes some of the aspects of the present disclosure.
Figure 4B:
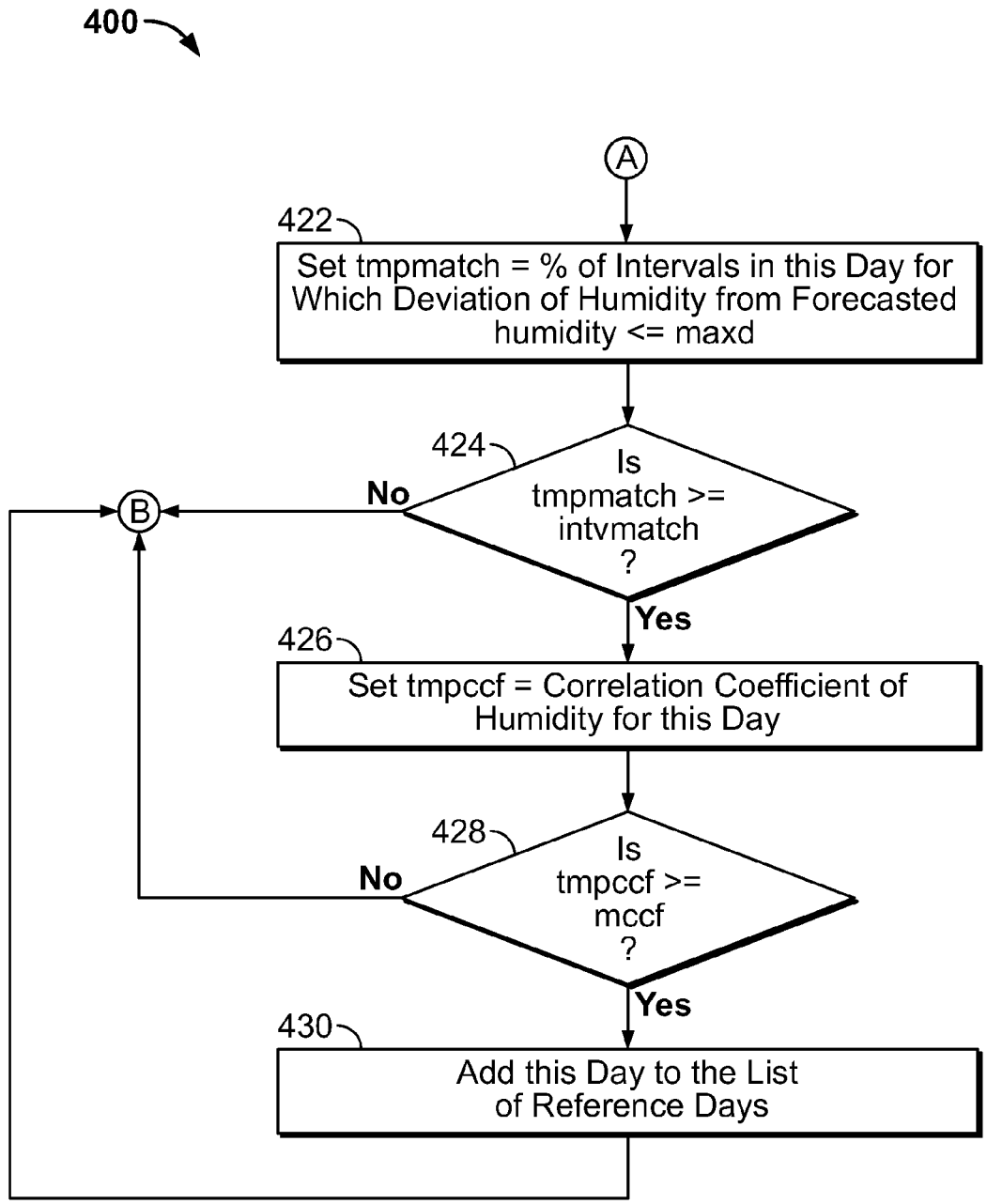

FIGS. 4A and 4B show a humidity filter algorithm 400 for progressively identifying matching reference days. The potential reference days closest to the matching criteria are identified first. If a sufficient number of matching reference days is not identified, the matching criteria are relaxed and additional matching reference days are identified. If the matching criteria are relaxed to levels indicating minimum tolerated similarity, and a sufficient number of matching reference days is still not identified, the load cannot be forecasted for the day.

According to the algorithm 400, certain values (high_match_delta, low_match_delta, deltastep, high_match_ccf, low_match_ccf, ccfstep, percentintvmatch) are initialized and defined (410). The algorithm 400 can, for example, initialize high and low threshold points for a humidity correlation coefficient and humidity deviation, as well as step size values representing the amount these values can be changed. Specifically:

a high_match_delta value represents a desired deviation of a humidity value from a corresponding value of the day to be forecasted. The high_match_delta value is represented in measurements of Relative Humidity ("RH"). The high_match_delta value can be initialized to 5 RH, for example;

a low_match_delta value represents a maximum acceptable deviation of a humidity value from a corresponding value of the day to be forecasted. The low_match_delta value is also represented in measurements of RH. The low_match_delta value can be initialized to 20 RH, for example;

a deltastep value represents a step size in which a maxd value, or maximum deviation value, can be progressively changed from the high_match_delta value down to the low_match_delta value until a desired number of matching reference days is found. The deltastep value is represented in measurements of RH, and can be initialized to 1 RH;

a high_match_ccf value represents a desired value of the correlation coefficient of humidity for a day to be selected as a matching reference day. Correlation coefficients are represented as numbers from 0 to 1. The high_match_ccf value can be initialized to 0.80 or 0.95, for example;

a low_match_ccf value represents a minimum acceptable value of the correlation coefficient of humidity for a day to be selected as a matching reference day. The low_match_ccf value can be initialized to 0.5, for example;

a ccfstep value represents a step size in which a mccf value (a minimum value of the correlation coefficient for humidity) can be progressively changed from the high_match_ccf value to the low_match_ccf value until the required number of reference days is identified. The ccfstep value can be initialized to 0.05; and a percentintvmatch value represents a percentage of the intervals that must have a deviation less than or equal to a deviation specified by the maxd value for a day to be selected as a matching reference day. The percentintvmatch value can be initialized to 75%.

The algorithm 400 initializes additional values (412). For example, the maxd value represents a maximum value of humidity deviation. The maxd value can be initialized to 5 RH, the same as the high_match_delta value; and a mccf value represents a minimum value of the correlation coefficient of humidity that is used to identify a matching reference day in the current iteration of the algorithm 400; the mccf value can be initialized to 0.80 or 0.95, depending on the value of high_match_ccf.

an intvmatch value is initialized to the value of percentintvmatch for example it can be initialized to 75.

The algorithm 400 initializes a list of matching reference days to ensure that the list is empty, and retrieves forecasted temperature and humidity values for the day to be forecasted (414). The forecasted temperature and humidity values can be represented as numerical values corresponding to each hour (or other time increment) of the day to be forecasted.

The algorithm 400 analyzes the records of historical days and creates a list of available historical days by selecting days with features that match features of the day to be forecasted (416). For example, features can include whether the day is a weekday, weekend, holiday, etc. The features can be represented, as numerical values, in feature fields of the records of the historical days. The algorithm 400 can, for example, determine whether a feature field of a record of a historical day matches a feature field of the record of the day to be forecasted and add the historical day to the list of available historical days if there is a match.

The algorithm 400 selects the next day that needs to be processed from the list of historical reference days identified with matching features in 416 (418). If the algorithm 400 determines that a day is found (420) then it proceeds to block 422 (FIG. 4B), described below. If the record for that day is not found, the algorithm 400 determines whether a required number of matching reference days has been found (432). If enough reference days have been found, the algorithm 400 ends (434). Otherwise, the algorithm 400 proceeds to block 436 to lower the criteria thresholds to try to find additional matching reference days.

At block 436, the algorithm 400 reinitializes the maxd and mccf values (436). Specifically, the maxd value is raised to represent a higher level of deviation permitted among the humidity values of potential reference days and the day to be forecasted. The mccf value is lowered, representing a lower permissible correlation coefficient of potential reference days. The maxd and mccf values can be changed by the deltastep and ccfstep values:

$$\text{max}d = \text{max}d + \text{deltastep} \quad \text{[Equation 2]}$$

$$mccf = mccf - ccf\text{step} \quad \text{[Equation 3]}$$

For example, if the progressive humidity filter values are set as follows:
required number of reference days=10
percentintvmatch=75%
deltastep=1 RH
ccfstep=0.05
and three matching reference days are found with maxd=5 RH and mccf=0.95, the algorithm 400 will reinitialize the maxd and mccf values to new values, relaxing the selection criteria for the subsequent selection of reference days:

$$\text{max}d = \text{previous max}d + \text{deltastep} = 5+1 = 6 \text{ RH} \quad \text{[Equation 4]}$$

$$mccf = \text{previous } mccf - ccf\text{step} = 0.95 - 0.05 = 0.90 \quad \text{[Equation 5]}$$

The algorithm 400 determines whether the new values of maxd and mccf have reached the lower threshold points set by the low_match_delta and low_match_ccf values (438). If either the new maxd value exceeds the low_match_delta value or the new mccf value is less than the low_match_ccf value, then the day cannot be forecasted because the required number of reference days cannot be found (440). If the required number of matching reference days cannot be found, the algorithm 400 terminates (434). If the new maxd value is less than the low_match_delta value, and the new mccf value is greater than the low_match_ccf value, the algorithm 400 proceeds to block 416.

Returning to block 420, if a historical day is found, a tmpmatch value is set to the percentage of time intervals (e.g., hours) in the historical day for which a deviation of the humidity value compared to the corresponding interval from day to be forecasted is less than or equal to the maxd value (422). The algorithm 400 compares the tmpmatch value to an intvmatch value (424). The intvmatch value represents a required number of intervals that have a deviation less than the maxd value. If the tmpmatch value is greater than or equal to the intvmatch value, a correlation coefficient of humidity for this day (tmpccf) with respect to day to be forecasted is calculated (426). If the tmpmatch value is less than the intvmatch value, the algorithm selects the next historical day (418).

The algorithm 400 determines whether the tmpccf value is greater than or equal to the mccf value (428). If the tmpccf value is greater than or equal to the mccf value, the reference day is added to the list of matching reference days (430). If the tmpccf value is less than the mccf value, the algorithm proceeds to block 418.

As shown in FIGS. 4A and 4B, matching reference days can progressively and iteratively be identified. This allows for the identification of reference days with values closest to the ideal matching criteria first. If a sufficient number of reference days cannot be identified using more preferred selection criteria, then the selection criteria can be relaxed in order to try to identify additional matching reference days. This ensures the days that are selected not only have similar humidity profiles to the day to be forecasted, but are also very similar in terms of humidity values to the day that to be forecasted. Thus only the highest quality available matches (with respect to humidity) are used to create a model. This increases the accuracy of forecasts. Moreover, if it is necessary to identify lower quality reference days to achieve a minimum number of reference days, those days will be clearly recognizable, and it will be possible to take this into account in assessing the accuracy of the model.

As explained above, once a sufficient number of matching reference days is identified, the processor 114 can use a regression method to determine the mathematic relationship between load values and temperature values, and calculate forecasted load values. The forecasted load values can be stored and output.

What has been shown is that the accuracy of load forecasting can be increased by identifying reference days that are similar both in humidity profile and humidity values to a day to be forecasted. Reference days with very similar humidity values and profiles to the day to be forecasted are selected first for use in calculating the relationship between temperature and load. Days with somewhat similar humidity values and profiles are selected only if higher quality reference days are not available. Days with similar humidity profiles as extremely dissimilar humidity values can be identified and excluded, further increasing the accuracy of load forecasting.

While particular aspects, embodiments, and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

What is claimed is:

1. Via a processor, a method of forecasting energy usage comprising:
   selecting a plurality of reference days with at least one feature matching a corresponding feature of a day to be forecasted;
   filtering the plurality of reference days with a humidity filter to identify at least one matching reference day wherein the at least one matching reference day is associated with:
      a correlation coefficient greater than or equal to a minimum correlation coefficient, and
      a minimum number of humidity values within a range of corresponding humidity values of the day to be forecasted;
   retrieving energy load values and corresponding temperature values corresponding to the at least one matching reference day;
   calculating a plurality of regression coefficients of a polynomial equation linking the temperature values to the energy load values; and
   calculating and storing a forecasted load value of the day to be forecasted according to the polynomial equation.

2. The method of claim 1, wherein the identifying the at least one matching reference day comprises:
   calculating the correlation coefficient associated with the at least one matching reference day, wherein the correlation coefficient represents an estimated magnitude and a direction of a linear relationship between a first set of humidity values associated with time intervals for the reference day and a second set of humidity values associated with corresponding time intervals for the day to be forecasted; and
   comparing the correlation coefficient to the minimum correlation coefficient.

3. The method of claim 2, wherein the minimum correlation coefficient is greater than 0.5.

4. The method of claim 1, further comprising:
   accessing stored historical load values at a plurality of time intervals for the at least one matching reference day;
   accessing stored humidity data corresponding to the time intervals; and
   accessing stored temperature data corresponding to the time intervals.

5. The method of claim 1, further comprising outputting the forecasted load value at an output device.

6. The method of claim 5, wherein the output device comprises at least one of a display and a printer.

7. The method of claim 1, wherein the calculating the forecasted load value of the day to be forecasted comprises calculating a load value associated with a time interval of the day to be forecasted.

8. The method of claim 1, wherein the at least one feature comprises a day of the week, a work day, a weekend day, or a holiday.

9. A method of identifying, via a processor, a matching reference day for energy usage forecasting, the method comprising:
   retrieving a reference day record from a memory;
   comparing feature information of the reference day record to a feature criteria;
   responsive to the feature information matching the feature criteria,
      comparing at least one humidity value associated with the reference day record to at least one forecasted humidity value, and
      calculating a correlation coefficient representing a comparison of a humidity profile associated with the reference day record to a forecasted humidity profile;
   responsive to the at least one humidity value being within a humidity deviation range of the at least one forecasted humidity value and the correlation coefficient equaling or exceeding a minimum correlation coefficient,
      identifying the reference day as a matching reference day; and
   storing the matching reference day in a matching reference day list in the memory.

10. The method of claim 9, further comprising:
    calculating a current number of matching reference days; and
    responsive to the current number of matching references being below a minimum number of reference days, increasing the humidity deviation range or decreasing the minimum correlation coefficient.

11. The method of claim 9, wherein the feature criteria comprises a value representing a day of the week, a value representing a work day, a value representing a weekend day, a value representing a holiday, or a value representing an atypical load day.

12. The method of claim 9, wherein the at least one humidity value corresponds to a time increment.

13. The method of claim 12, wherein the time increments comprise increments of 15 minutes, 30 minutes, or one hour.

14. The method of claim 9,
    wherein the comparing the at least one humidity value of the reference day record to the at least one forecasted humidity value comprises comparing a plurality of humidity values of the reference day, each humidity value associated with a time interval of the reference day, to a plurality of forecasted humidity values, each forecasted humidity value associated with a corresponding time interval of the forecasted day,
    the method further comprising:
    determining a number of the plurality of humidity values that are within the humidity range of a forecasted humidity value associated with a corresponding time interval; and
    determining that the number of the plurality of humidity values equals or exceeds a minimum number of humidity values.

15. The method of claim 9, further comprising:
    retrieving a plurality of temperature values from the reference day record; and
    calculating a regression method based on the plurality of temperature values from the reference day record, wherein the regression method predicts energy usage values corresponding to temperature values.

16. The method of claim 15, further comprising calculating and storing a predicted load value for a forecasted temperature value based on the regression method.

17. The method of claim 16, further comprising outputting the predicted load value at an output device, wherein the output device comprises at least one of a display and a printer.

18. A non-transitory computer readable medium having stored thereon instructions for identifying a matching reference day for energy usage forecasting, comprising machine executable code that when executed by a processor, causes the processor to perform steps comprising:

retrieving a reference day record from a memory;

comparing feature information of the reference day record to a feature criteria;

responsive to the feature information matching the feature criteria, comparing at least one humidity value associated with the reference day record to at least one forecasted humidity value, and calculating a correlation coefficient representing a comparison of a humidity profile of the reference day record to a forecasted humidity profile;

responsive to the at least one humidity value being within a humidity deviation range of the at least one forecasted humidity value and the correlation coefficient equaling or exceeding a minimum correlation coefficient, identifying the reference day as a matching reference day; and storing the matching reference day in a matching reference day list in the memory.

19. The medium as set forth in claim 18, further comprising:

calculating a current number of matching reference days; and responsive to the current number of matching references being below a minimum number of reference days, increasing the humidity range or decreasing the minimum correlation coefficient.

20. The medium as set forth in claim 18, further comprising:

retrieving a plurality of temperature values from the reference day record; and calculating a regression method based on the plurality of temperature values from the reference day record, wherein the regression method predicts energy usage values corresponding to the temperature values.

* * * * *